(12) United States Patent
Singh et al.

(10) Patent No.: US 7,460,491 B2
(45) Date of Patent: Dec. 2, 2008

(54) METHOD AND SYSTEM FOR DISCOVERING CIRCUITS IN A NETWORK

(75) Inventors: Pradeep Singh, Rohnert Park, CA (US); Joseph Marchionni, Petaluma, CA (US); David Friedman, Roseville, CA (US)

(73) Assignee: Cisco Technology, Inc., San Jose, CA (US)

( * ) Notice: Subject to any disclaimer, the term of this patent is extended or adjusted under 35 U.S.C. 154(b) by 539 days.

(21) Appl. No.: 11/040,257

(22) Filed: Jan. 19, 2005

(65) Prior Publication Data
US 2006/0159212 A1 Jul. 20, 2006

(51) Int. Cl.
*H04L 7/00* (2006.01)
*H04L 12/28* (2006.01)
*H04J 3/02* (2006.01)

(52) U.S. Cl. .................. 370/254; 370/389; 370/537; 375/356

(58) Field of Classification Search .......... 370/352–386, 370/389–395, 535–539; 375/352–359; 709/224–241
See application file for complete search history.

(56) References Cited

U.S. PATENT DOCUMENTS

| | | | |
|---|---|---|---|
| 6,294,991 B1 | 9/2001 | Allen et al. | |
| 6,301,254 B1 | 10/2001 | Chan et al. | |
| 6,487,223 B1 * | 11/2002 | Tanonaka | 370/539 |
| 6,801,548 B1 * | 10/2004 | Duschatko et al. | 370/537 |
| 7,031,341 B2 * | 4/2006 | Yu | 370/469 |
| 7,068,663 B1 * | 6/2006 | Adler | 370/395.51 |
| 7,133,402 B2 * | 11/2006 | Nomura et al. | 370/389 |
| 7,197,008 B1 * | 3/2007 | Shabtay et al. | 370/218 |
| 2002/0122442 A1 * | 9/2002 | Suemura | 370/535 |
| 2004/0076175 A1 * | 4/2004 | Patenaude | 370/465 |
| 2005/0010681 A1 * | 1/2005 | Katukam et al. | 709/238 |
| 2005/0254527 A1 * | 11/2005 | Jakel et al. | 370/539 |
| 2006/0133366 A1 * | 6/2006 | Ho et al. | 370/389 |
| 2006/0143544 A1 * | 6/2006 | Ho et al. | 714/44 |
| 2006/0153179 A1 * | 7/2006 | Ho et al. | 370/386 |

* cited by examiner

*Primary Examiner*—Man Phan
(74) *Attorney, Agent, or Firm*—Cindy Kaplan

(57) ABSTRACT

A method and system for representing a low-order connection and a high-order connection as a single circuit are disclosed. The method includes creating a low-order listener object and a low/high listener object at each end point of the low-order connection and creating a high-order listener object at each end point of the high-order connection. The low/high listener objects are matched with the high-order listener objects to create a link and represent the connections as a single circuit.

23 Claims, 14 Drawing Sheets

METHOD AND SYSTEM FOR DISCOVERING CIRCUITS IN A NETWORK

BACKGROUND OF THE INVENTION

The present invention relates generally to communication networks, and more specifically, to discovering a circuit having different types of connections.

Today, SONET/SDH is the predominant technology for transport in worldwide public carrier networks. A SONET/SDH network includes nodes (network elements) interconnected by links. A network circuit can traverse one or more network elements. Each intermediate NE performs a cross connect function connecting the circuit data from one link to another to deliver data to the circuit destination. Creation of a multi-node SONET or SDH circuit requires the establishment of connections at source, destination, and intermediate nodes. Service providers often bypass a vendor's network manager application and connect directly to each network element in the circuit path to create the circuit cross connections. A network management interface may then be used to splice these individual connections to represent the complete end-to-end circuit. Aggregating the individual cross-connections into an end-to-end circuit is important to network management. This information is used for displaying and editing circuit properties such as direction, protection type (e.g., 1+1, UPSR, BLSR) and circuit end-points. Service providers therefore require the vendor's network management system to recognize such cross-connections and represent them as a complete end-to-end circuit.

Conventional circuit aggregation algorithms typically require that the cross-connections are the same type and size. For example, STS-1 connections can only be spliced with STS-1 connections, VT1.5 connections can be only be spliced with VT1.5 connections, VC4 connections can only be spliced with VC4 connections, and VC11 connections can only be spliced with VC11 connections.

Many high-order (HO) types of cross-connections are designed to carry multiple low-order (LO) paths. For example, a STS-1 path is designed to carry 28 VT1.5 paths and a VC4 path is designed to carry three VC3 paths. A high-order path (or cross-connection) transporting multiple low-order paths is referred to as low-order tunneling or low-order aggregation. Low-order tunnels (LOTs) and low-order aggregation points (LAPs) are commonly used by customers to optimize low-order matrix utilization, which implies creating low-order connections at the source and destination nodes of the circuit and high-order connections in the intermediate nodes.

FIG. 1 illustrates an example of a low-order circuit tunneling through high-order connections. The circuit includes a source node A, destination node D, and intermediate nodes B and C. The source and destination nodes may have VT connections and the intermediate nodes may have STS connections, for example. In this sequence of connections, the low-order circuit/traffic path is complete between the source and destination low-order connections, even though the connection types are different between the source and intermediate nodes. Conventional algorithms do not recognize this circuit as a single circuit, but instead as a set of three circuits: (1) the low-order connection at node A forms one circuit; (2) the intermediate high-order connections (nodes B and C) splice together to form one high-order circuit; and (3) the low-order connection at node D forms one circuit.

There is, therefore, a need for a method and system for representing low-order circuits using high-order paths as a single circuit so that a circuit having connections of different connection types can be discovered and managed.

SUMMARY OF THE INVENTION

A method and system for representing a low-order connection and a high-order connection as a single circuit are disclosed. The method generally comprises creating a low-order listener object and a low/high listener object at each end point of the low-order connection and creating a high-order listener object at each end point of the high-order connection. The low/high listener objects are matched with the high-order listener objects to create a link and represent the connections as a single circuit.

The link may be a low-order tunnel or the high-order connection may be a low-order aggregation point, for example.

In another aspect of the invention, a method for discovering a circuit comprising different connection types generally comprises creating a low-order listener object and a low/high listener object at each end point of low-order connections within the circuit and creating a high-order listener object at each end point of high-order connections within the circuit. The low/high listener objects are matched with the high-order listener objects to create a link and circuit level properties of the circuit are computed.

In yet another aspect of the invention a network circuit manager generally comprises a processor operable to create a low-order listener object and a low/high listener object at each end point of low-order connections within the circuit, create a high-order listener object at each end point of high-order connections within the circuit, match the low/high listener objects with the high-order listener objects to create a link, and compute circuit level properties of the circuit. The manager further comprises memory for at least temporarily storing network information obtained from network elements in communication with the network circuit manager.

Further understanding of the nature and advantages of the inventions herein may be realized by reference to the remaining portions of the specification and the attached drawings.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A method and system of the present invention are used to discover a circuit having different connection types. The present invention operates in the context of a data communication network including multiple network elements. The network may be a SONET/SDH network and a network element may be a terminal multiplexer, an add-drop multiplexer (ADM), an optical cross-connect (OXC), a signal regenerator, router, switch, or other optical node interface, for example. The system and method described herein may be incorporated, for example, into an optical transport platform, such as ONS 15327, 15454, or 15455 available from Cisco Systems, Inc.

Figure 1:
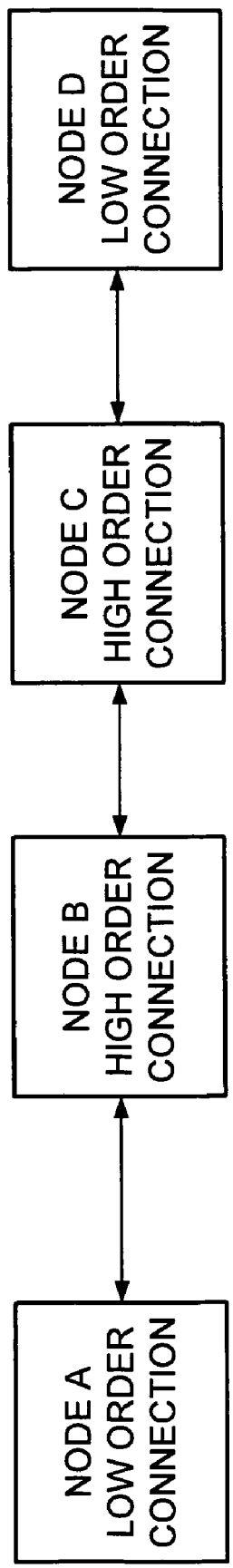
FIG. 1 is an example of a low order circuit tunneling through a high order connection.
Figure 2:
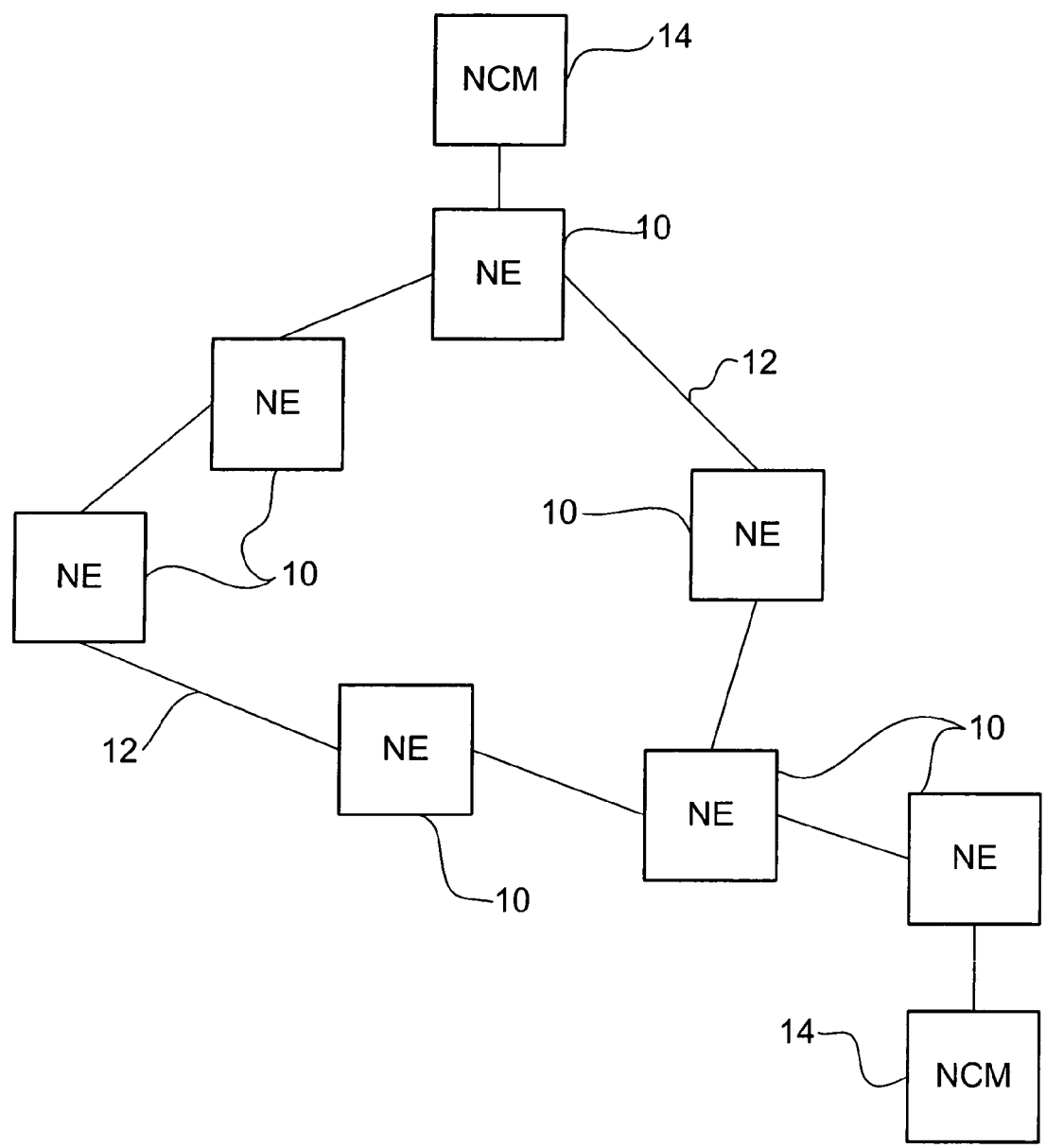
FIG. 2 is a block diagram of network circuit managers and network elements for use with one embodiment of the present invention.

Referring now to the drawings, and first to FIG. 2, an example of a network that may be used in the present invention is shown. The network includes nodes (also referred to as network elements or NEs) 10 interconnected by links (spans) 12. The network elements 10 are interconnected by optical fiber links 12 which include an optical fiber cable or multiple cables connected serially, as is well known by those skilled in the art. Each link 12 carries one or more transport signals, (e.g., STS (Synchronous Transport Signals). A network circuit can traverse one or more NEs 10. Each intermediate NE 10 performs a cross-connect function, connecting the circuit data from one link to another to deliver data to a destination.

A network circuit manager (NCM) 14 runs on a computer connected to a NE 10. The network circuit manager 14 may operate, for example, on a computerized network management system (NMS). The network shown in FIG. 2 may be, for example, a SONET network managed via one or more network management stations. The network shown may also be part of a larger SONET/SDH network. The network circuit manager 14 may be connected to the NE 10 by an Ethernet link or some other interface (e.g., serial port, wide area network, wireless connection, or other suitable interface). The network circuit manager 14 queries the NEs 10 for the state of their cross-connects or other circuit information stored at the NEs.

The network circuit manager 14 may be run on a (user) computer such as a stand-alone desktop computer, laptop computer, or other suitable communication device. The computer may include, for example, a CTC (Cisco Transport Controller), available from Cisco, Systems, Inc. or other sub-network interface tool that can be used for node control. For example, the network circuit manager may be a network and circuit provisioning component of the CTC. A network element interface, such as Transaction Language 1 (TL1) may be used to create cross-connections. TL1 allows a service provider to connect directly to a vendor's network elements using non-vendor network management systems. It is to be understood that other network element interfaces may be used without departing from the scope of the invention. The network circuit manager 14 may be implemented by object oriented software using CORBA (Common Object Request Broker Interface) or other appropriate software. The NE 10 and network circuit manager 14 include a processor and memory and may be implemented on a computer system such as described below with respect to FIG. 14, for example. It is to be understood that the network shown in FIG. 2 is only one example and that the system and method disclosed herein may be used in various types of network configurations without departing from the scope of the invention.

Figure 3:
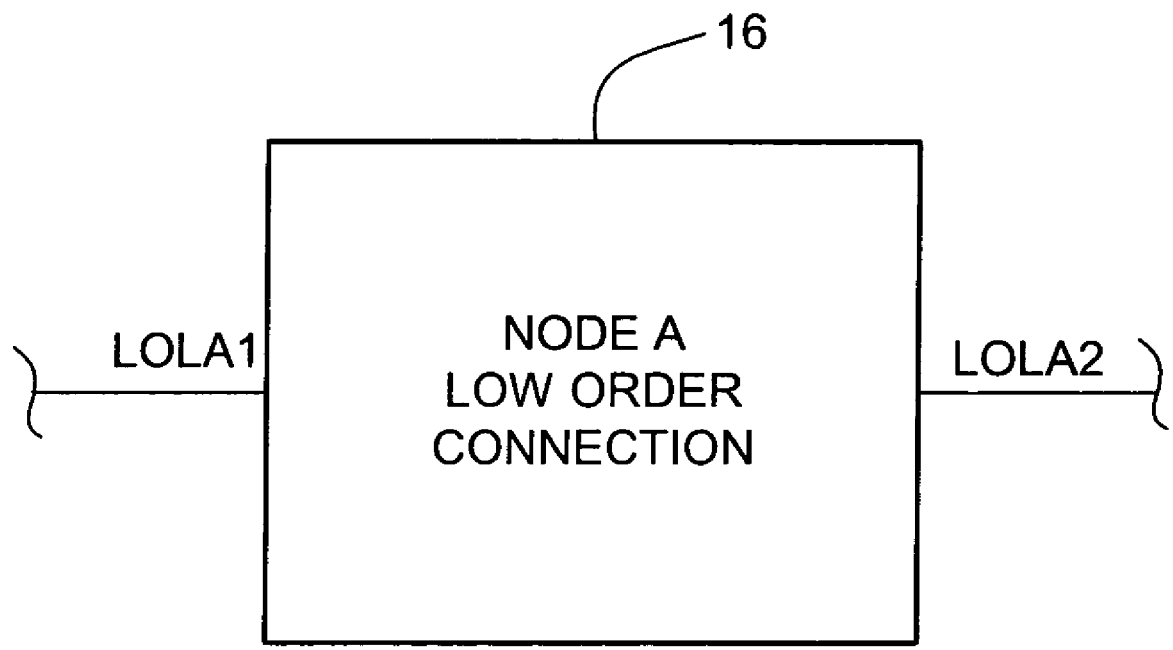
FIG. 3 is a diagram illustrating listener objects created at a low-order connection node.
Figure 4:
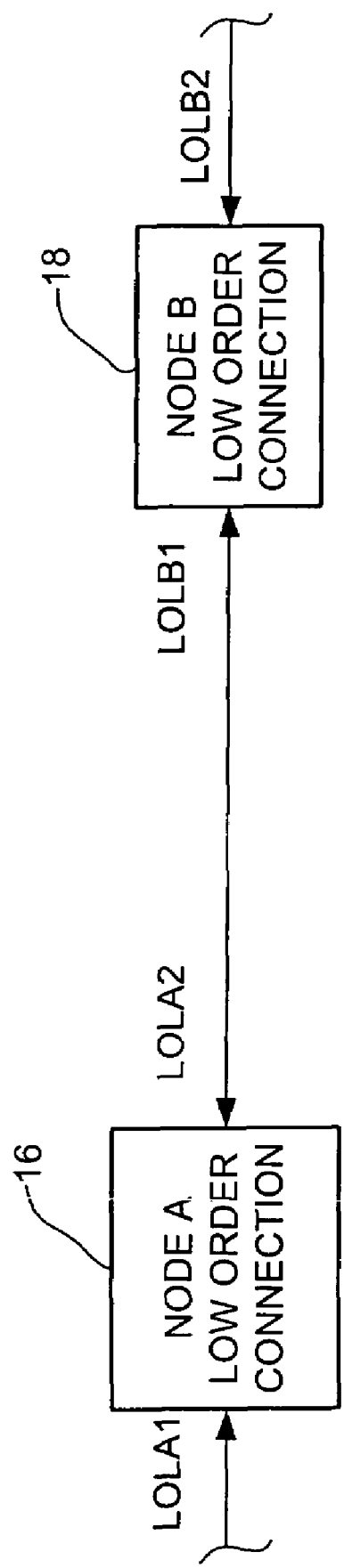
FIG. 4 is a diagram illustrating two low-order connection nodes and associated listener objects.

In order to splice a connection with other connections of the same circuit, the network circuit manager 14 creates listener objects at two end-points of the connection. FIG. 3 illustrates an example of a node having a low order cross-connection. The network circuit manager 14 creates two low-order (LO) listener objects, LO-listener A1 (LOLA1) and LO-listener A2 (LOLA2) at node A (16). FIG. 4 illustrates a connection between node A (16) of FIG. 2 and node B (18) also having a low-order connection. Node B (18) has two low-order listeners, low-order listener B1 (LOLB1) and low-order listener B2 (LOLB2). As shown in FIG. 4, LO-listener A2 lies on one end of a network link and LO-listener B1 on the other end and the two listeners are spliced together to provide a single low-order circuit between nodes A (16) and B (18).

Figure 5:
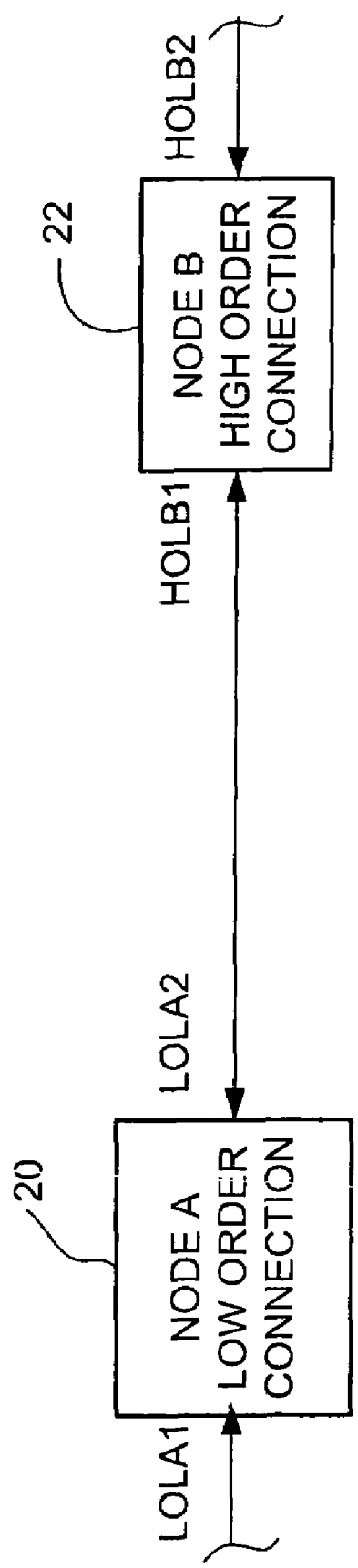
FIG. 5 is a diagram illustrating a low-order connection and high-order connection before creation of adit listener objects at the low order connection.
Figure 6:
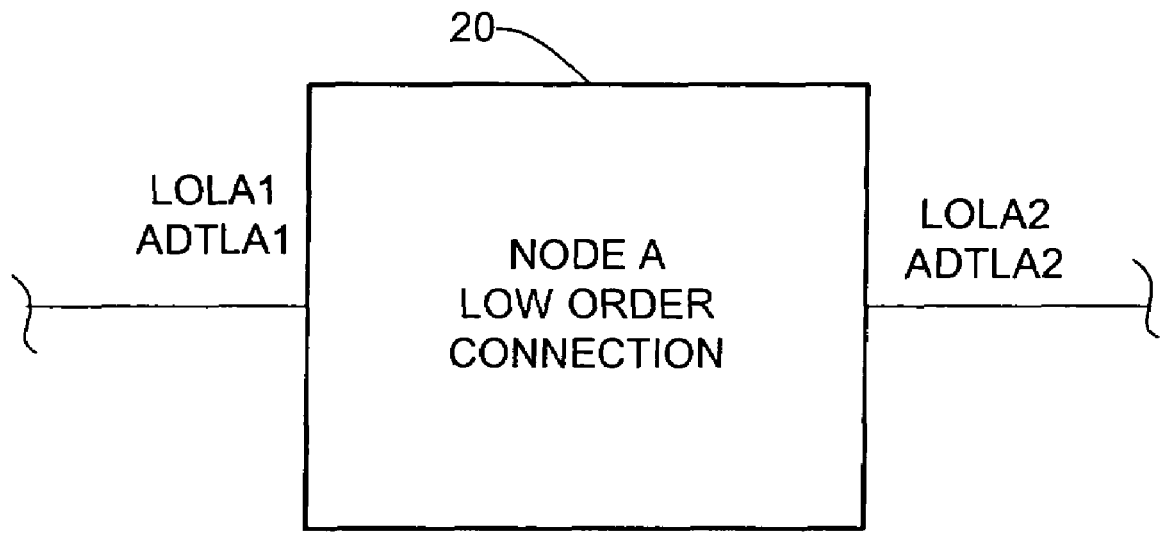
FIG. 6 is a diagram illustrating the adit listener objects associated with the low order connection of FIG. 5.

FIG. 5 illustrates a low-order connection at node A (20) and a high-order connection at node B (22). The network circuit manager creates high-order listener B1 (HOLB1) and high-order listener B2 (HOLB2) at the end points of node B (22). However, there is now a conflict between the low-order and high-order circuits. In order to resolve this conflict, the network circuit manager creates two listener objects at node A (20) (FIG. 6). The first object is the low-order listener object (LOLA1, LOLA2) that looks for matching low-order listeners. The second object is a low/high listener object that allocates low-order paths within a high order path. The low/high listener object is referred to herein as an adit listener object. The adit listener object (ADTLA1, ADTLA2) is created for the high-order connection on the same path as the low-order connection. The adit listener looks for matching high-order connections.

Figure 7:
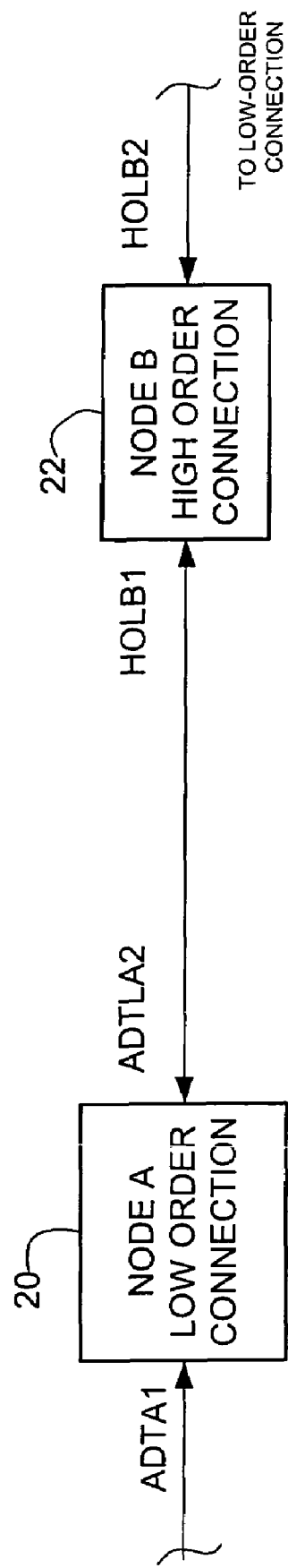
FIG. 7 is a diagram illustrating the low-order connection and high-order connection of FIG. 5 with the new listener objects at the low-order connection.

FIG. 7 shows the link between the low-order and high-order connections of FIG. 5 modified to include the new adit listeners (ADTA1, ADTA2). Adit listener A2 matches with high-order listener B1 and the network circuit manager recognizes this as a case where a tunnel is being created at node B (22). The other end of node B (22) is also in communication with a low-order connection, which is described below with respect to FIG. 8.

Figure 8:
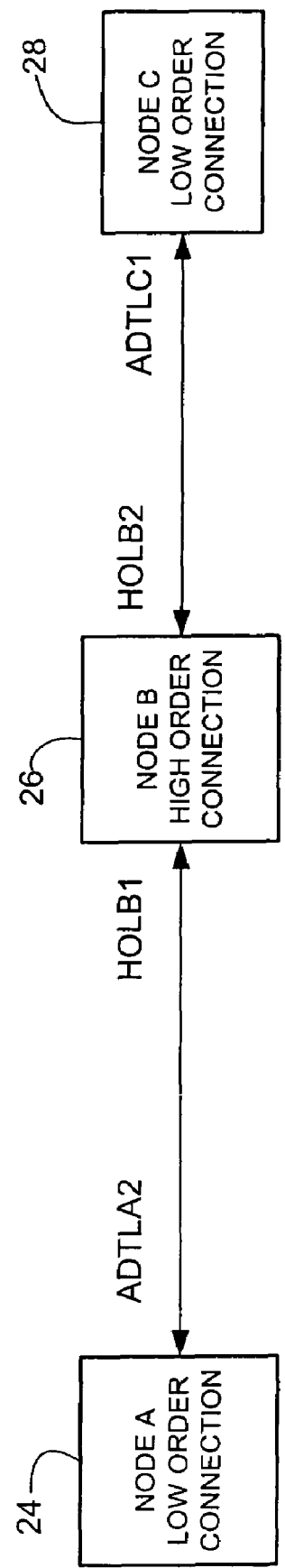
FIG. 8 is a diagram illustrating a high-order connection in communication with two low-order connections and the associated listener objects.
Figure 9:
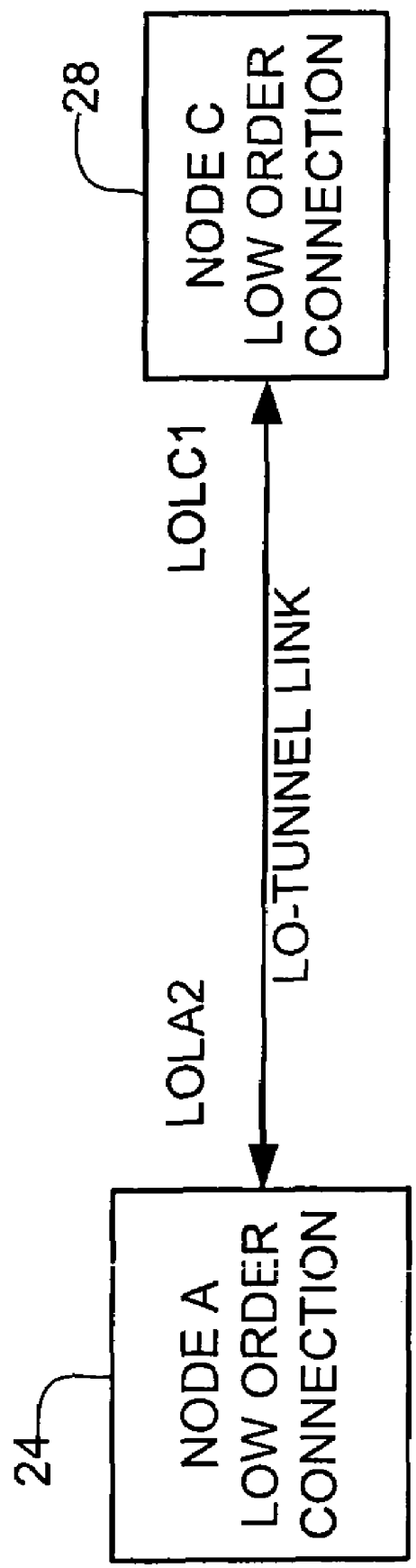
FIG. 9 is a diagram illustrating a low-order tunnel link connecting node A directly to node C of FIG. 8 using the listener objects.

FIG. 8 illustrates an example for three nodes, node A (24) having a low-order connection, node B (26) with a high-order connection, and node C (28) with a low-order connection. Node A (24) has an adit listener object ADTLA2, node B (26) has two high-order listener objects HOLB1 and HOLB2, and node C (28) has an adit listener object ADTLC1, at their respective end points. When a matching adit listener is found at node C (28) for high-order listener B2, the network circuit manager 14 converts the connection at node B (26) to a low-order tunnel link (FIG. 9). The two low-order connections at node A (24) and node C (28) are spliced together using low-order listeners over the low-order tunnel link connecting node A (24) directly to node C (28). The low-order tunnel link represents the high-order path existing between adit listener A2 to adit listener C1, which is used to carry low-order traffic. The network circuit manager 14 now recognizes the low-order to high-order to low-order sequence of connections as a single low-order circuit.

Figure 10:
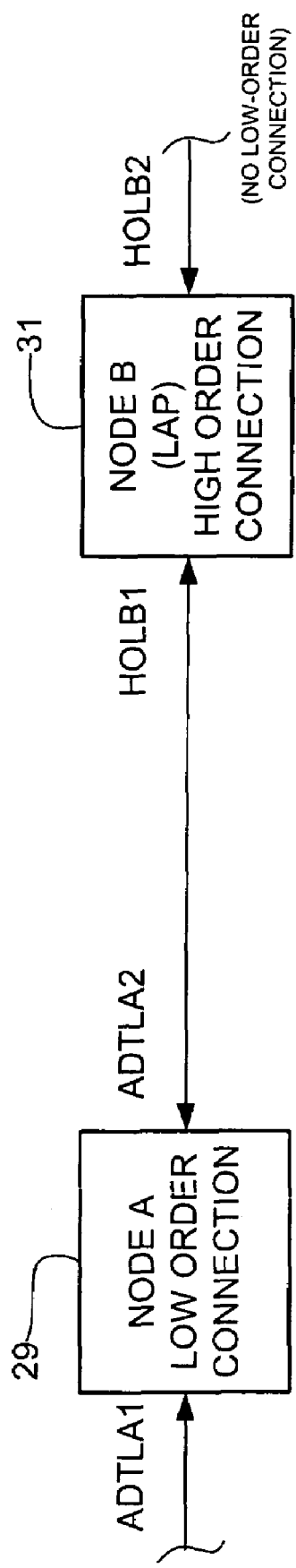
FIG. 10 is a diagram illustrating a low-order aggregation point.

The method and system described above may also be used to recognize low-order aggregation points (LAPs). The LAP is an opaque, high-order path (i.e., set of high-order cross-connects) used to aggregate low-order paths into a high-order path. The LAP has a low-order connection terminating into an aggregating high-order connection. FIG. 10 shows a low-order connection at node A (29) and a high-order connection at node B (31). The high-order connection at node B (31) is recognized as a LAP, since it has a low-order connection at only one end. A high-order connection, therefore, becomes a low-order tunnel if it has low-order connections at both ends and a LAP if it has a low-order connection at only one end.

Figure 11:
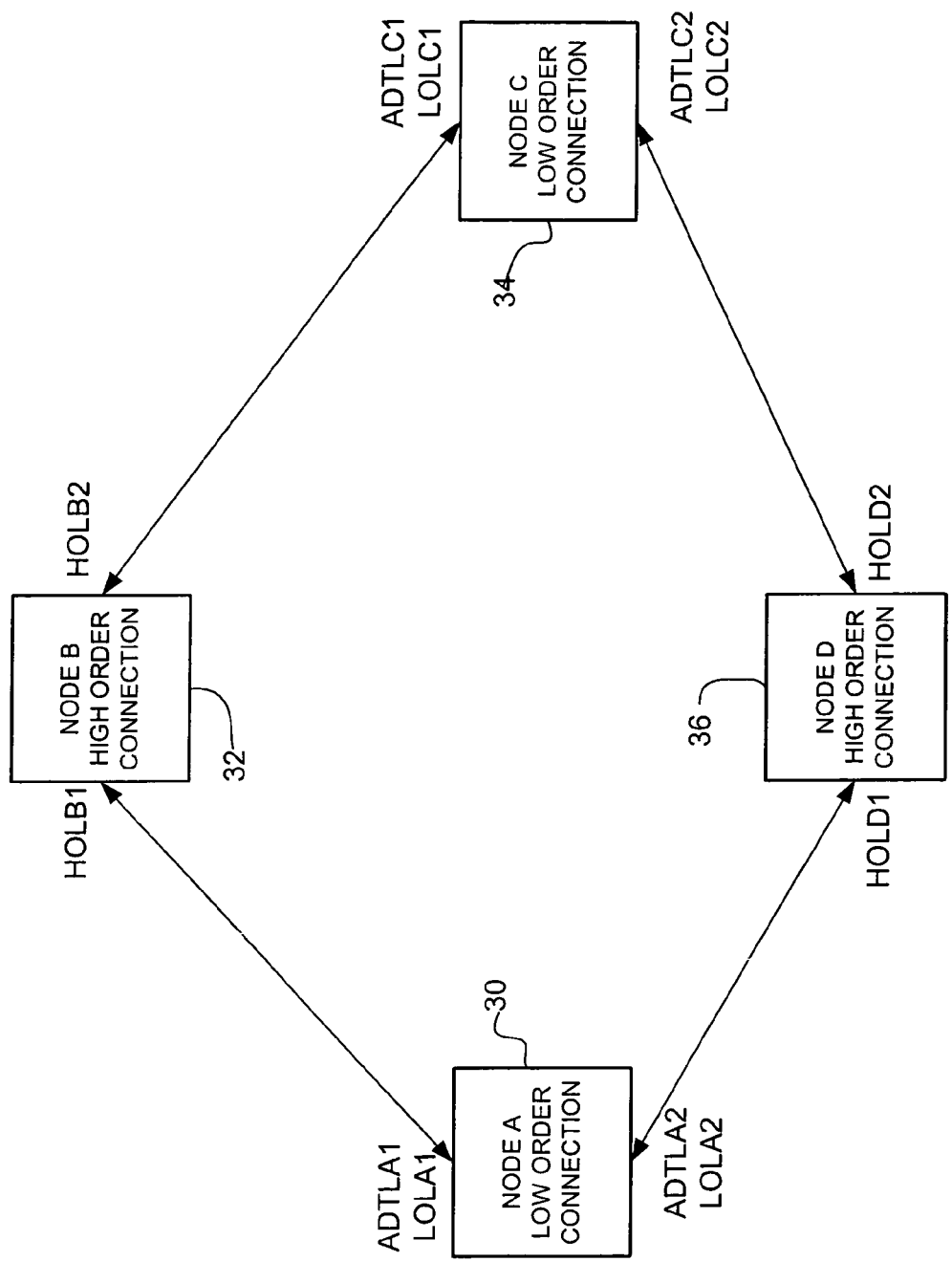
FIG. 11 is a diagram illustrating a UPSR protected circuit and listener objects for each node.
Figure 12:
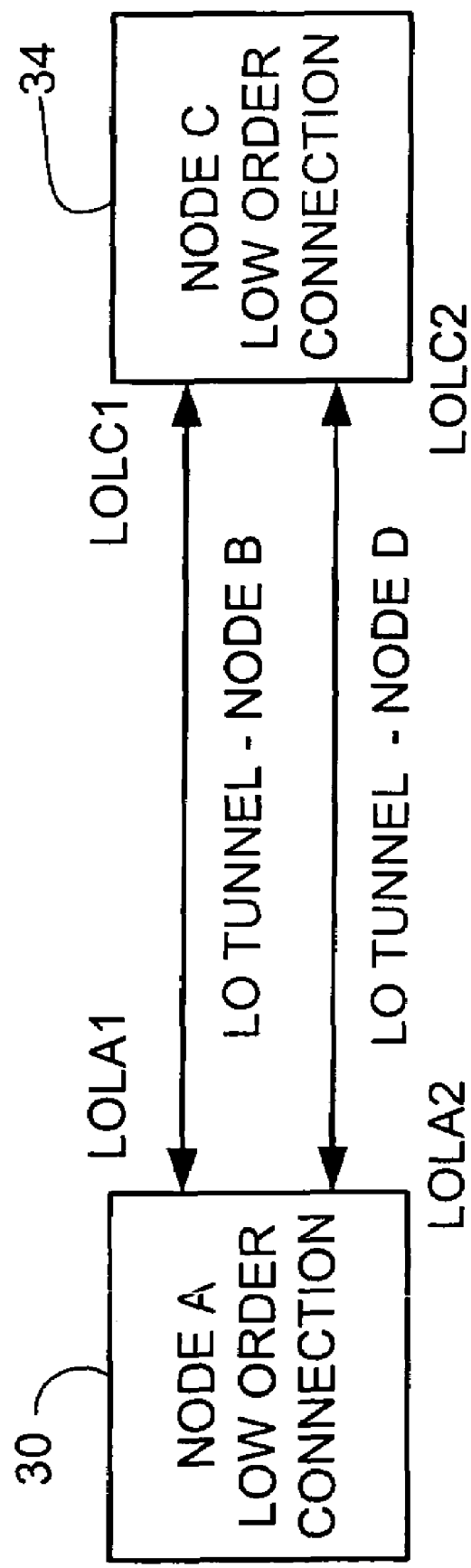
FIG. 12 is a diagram illustrating two low-order tunnels connecting node A and node C of FIG. 11 to represent a single UPSR protected low-order circuit.

The low-order tunnels and low-order aggregation points may also be used for protected low-order circuits (e.g., 1+1, UPSR, and BLSR). FIGS. 11 and 12 illustrate how the present invention is used for high-order connections providing UPSR protection to a low-order circuit. The ring shown in FIG. 11 includes four nodes: node A (30); node B (32); node C (34); and node D (36). Nodes A (30) and C (34) have low-order connections and nodes B (32) and D (36) have high-order connections. A user creates four connections to get a UPSR protected low-order circuit:

At node A (30): a head low-order connection with one source and two drops;

At nodes B (32) and D (36): high-order connections;

At node C (34): a tail low-order connection with two sources and one drop.

The network circuit manager 14 creates high-order listeners HOLB1, HOLB2 at node B (32) and HOLD1, HOLD2 at node D (36). Since nodes A (30) and C (34) have low-order connections, the network circuit manager 14 creates two listener objects at each connection point of the nodes. LOLA1, ADTLA1, LOLA2, and ADTLA2 are created at node A (30) and LOLC1, ADTLC1, LOLC2, and ADTLC2 are created at node C (34). The high-order connections are recognized as low-order tunnels and the ring of FIG. 11 is represented as shown in FIG. 12. The two low-order connections at nodes A (30) and C (34) can be connected over the new links, providing a single UPSR protected low-order circuit.

Figure 13:
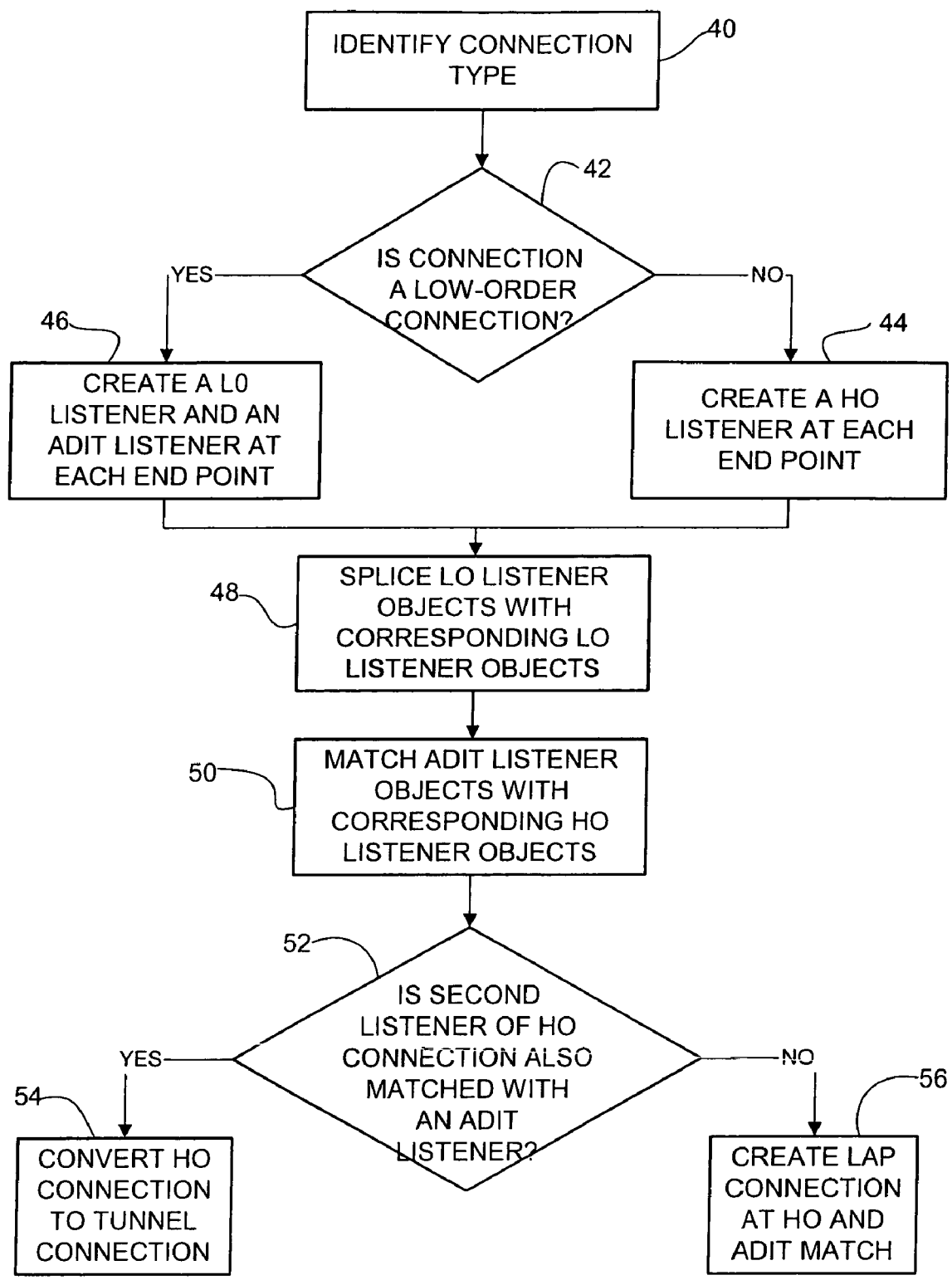
FIG. 13 is a flowchart illustrating a process of the present invention for discovering a circuit having different connection types.

FIG. 13 is a flowchart illustrating one embodiment of a process of the present invention for representing circuits having different connection types. At step 40, the connection types are identified. If the connection is a high-order connection, high-order listener objects are created at each end point (steps 42 and 44). If the connection is a low-order connection, low order listener objects and adit (low/high) listener objects are created at each end point (steps 42 and 46). The low-order listener is spliced with corresponding low-order listeners at step 48. The adit listener objects are matched with corresponding high-order listener objects at step 50. If a high-order connection has only one of its listeners matched to an adit listener, it is converted to a LAP connection (steps 52 and 56). If a second listener object of the high-order connection is also matched with another adit listener, the high-order connection is converted to a tunnel connection (steps 52 and 54).

Figure 14:
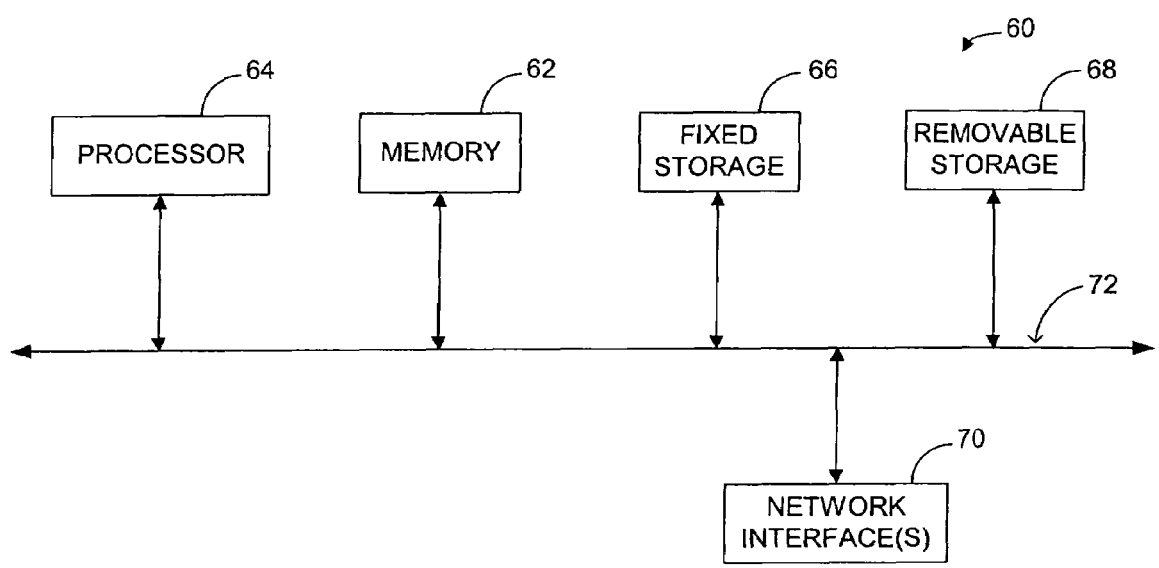
FIG. 14 is a system block diagram of a computer system that can be utilized to execute software of an embodiment of the present invention.

FIG. 14 shows a system block diagram of computer system 60 that may be used to execute software of an embodiment of the invention. The computer system 60 includes memory 62 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Computer system 60 further includes subsystems such as a central processor 64, fixed storage 66 (e.g., hard drive), removable storage 68 (e.g., CD-ROM drive), and one or more network interfaces 70. Other computer systems suitable for use with the invention may include additional or fewer subsystems. For example, computer system 60 may include more than one processor 64 (i.e., a multi-processor system) or a cache memory. The computer system 60 may also include a display, keyboard, and mouse (not shown) for use as a host.

The system bus architecture of computer system 60 is represented by arrows 72 in FIG. 14. However, these arrows are only illustrative of one possible interconnection scheme serving to link the subsystems. For example, a local bus may be utilized to connect the central processor 64 to the system memory 62. Computer system 60 shown in FIG. 14 is only one example of a computer system suitable for use with the invention. Other computer architectures having different configurations of subsystems may also be utilized.

As can be observed from the foregoing, the present invention has numerous advantages. Representing a low-order circuit using high-order paths as a single circuit helps the network management system to compute its circuit level properties, including direction, protection, and drop-points of the circuit. The circuit properties can then be edited as a single entity. For example, in the case of a low-order circuit using low-order tunnels providing UPSR protection, the low-order path can be switched between the working and protect paths by one command at the network management interface. In the three-circuit representation this has to be done manually on each component circuit. Furthermore, the low-order tunnel link discovery needs to be done only once (i.e., for the first low-order circuit). Thereafter any additional low-order connections created on the same nodes and using the same high-order path can reuse the low-order tunnel link. The adit listener objects also have information on how many low-order circuits are currently passing therethrough. This can be used to prevent accidental deletion of the low-order tunnel link.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for representing at least one low-order connection and at least one high-order connection as a single circuit at a network circuit manager in communication with a network comprising said low-order and high-order connections, the method comprising:

creating at the network circuit manager, a low-order listener object and a low/high listener object at each end point of said at least one low-order connection;

creating a high-order listener object at each end point of said at least one high-order connection; and matching the low/high listener object with the high-order listener object to create a low-order link, wherein said link represents said low-order and high-order connections as a single circuit within the network;
wherein said at least one low-order connection comprises two low-order connections each comprising low-order listener objects and low/high listener objects at each end point, and said at least one high-order connection is in communication with the two low-order connections, and further comprising converting the high-order connection to the low-order link.

2. The method of claim 1 wherein the link is a low-order tunnel.

3. The method of claim 2 further comprising connecting a new low-order connection at said at least one low-order connection and the new low-order connection using the low-order tunnel.

4. The method of claim 1 wherein said low-order link is a low-order aggregation point and at least one high-order connection is in communication with a low-order connection at only one end, and further comprising converting the high-order connection to said low-order aggregation point.

5. The method of claim 1 wherein said at least one low-order connection comprises at least two low-order connections and said at least one high-order connection comprises at least two-high-order connections and wherein the low-order connections and the high-order connections form a Unidirectional Path Switched Ring (UPSR).

6. The method of claim 5 further comprising creating two low-order tunnels through said at least two high-order connections to provide a UPSR protected low-order circuit.

7. The method of claim 6 further comprising switching the working and protect paths of the UPSR.

8. The method of claim 1 wherein the low/high listener objects comprise information on how many low-order circuits are passing therethrough.

9. The method of claim 1 further comprising computing circuit level properties of the circuit utilizing a network element interface at the network circuit manager.

10. The method of claim 9 wherein computing circuit level properties comprises editing the circuit properties as a single entity.

11. The method of claim 9 wherein computing circuit level properties comprises detecting drop-points of the circuit.

12. The method of claim 9 wherein the circuit is a UPSR protected circuit.

13. The method of claim 12 further comprising switching the working and protect paths of the UPSR.

14. A program on a computer readable medium storing computer-executable instructions for representing at least one low-order connection and at least one high-order connection as a single circuit at a network circuit manager in communication with a network comprising said low-order and high-order connections, said instructions comprising:
creating at the network circuit manager a low-order listener object and a low/high listener object at each end point of said at least one low-order connection;
creating a high-order listener object at each end point of said at least one high-order connection; and
matching the low/high listener object with the high-order listener object to create a link and represent the connections as a single circuit within the network;
wherein said at least one low-order connection comprises two low-order connections each comprising low-order listener objects and low/high listener objects at each end point, and said at least one high-order connection is in communication with the two low-order connections, and further comprising converting the high-order connection to the low-order link.

15. A program on a computer readable medium of claim 14 wherein the computer readable medium is selected from the group consisting of CD-ROM, floppy disk, zip disk, tape, flash memory, system memory, and hard drive.

16. A program on a computer readable medium of claim 14 wherein said at least one high-order connection is in communication with said at least one low-order connection at one end and another low-order connection comprising a low/high listener object and a low-order listener object at the other end, and further comprising instructions for converting the high-order connection to a low-order tunnel.

17. A program on a computer readable medium of claim 14 wherein said at least one high-order connection is in communication with a low-order connection at only one end and further comprising instructions for converting the high-order connection to a low-order aggregation point.

18. A system for representing at least one low-order connection and at least one high-order connection as a single circuit at a network circuit manager in communication with a network comprising said low-order and high-order connections, comprising:
means for creating at the network circuit manager, a low-order listener object and a low/high listener object at each end point of said at least one low-order connection;
means for creating a high-order listener object at each end point of said at least one high-order connection; and
means for matching the low/high listener object with the high-order listener object to create a low-order link, wherein said link represents the connections as a single circuit within the network;
wherein said at least one low-order connection comprises two low-order connections each comprising low-order listener objects and low/high listener objects at each end point, and said at least one high-order connection is in communication with the two low-order connections, and further comprising converting the high-order connection to the low-order link.

19. The system of claim 18 wherein the link is a low-order tunnel.

20. The system of claim 18 further comprising means for computing circuit level properties of the single circuit.

21. A network circuit manager for use in discovering a circuit comprising different connection types, the manager comprising:
a processor operable to create a low-order listener object and a low/high listener object at each end point of low-order connections within the circuit, create a high-order listener object at each end point of high-order connections within the circuit, match the low/high listener objects with the high-order listener objects to create a low-order link, wherein said low-order link represents the connections as a single circuit, and compute circuit level properties of the circuit; and
memory for at least temporarily storing network information obtained from network elements in communication with the network circuit manager;
wherein said at least one low-order connection comprises two low-order connections each comprising low-order listener objects and low/high listener objects at each end point, and said at least one high-order connection is in communication with the two low-order connections, and further comprising converting the high-order connection to the low-order link.

22. The network circuit manager of claim 21 wherein the network circuit manager is configured to interface with the network elements utilizing Transaction Language 1.

23. The network circuit manager of claim 21 wherein the circuit level properties comprise direction, protection, and drop-points of the circuit.

* * * * *